May 30, 1967  W. T. GUNDELFINGER ETAL  3,321,789
HAIR BRUSH CLEANING DEVICE
Filed Oct. 21, 1965
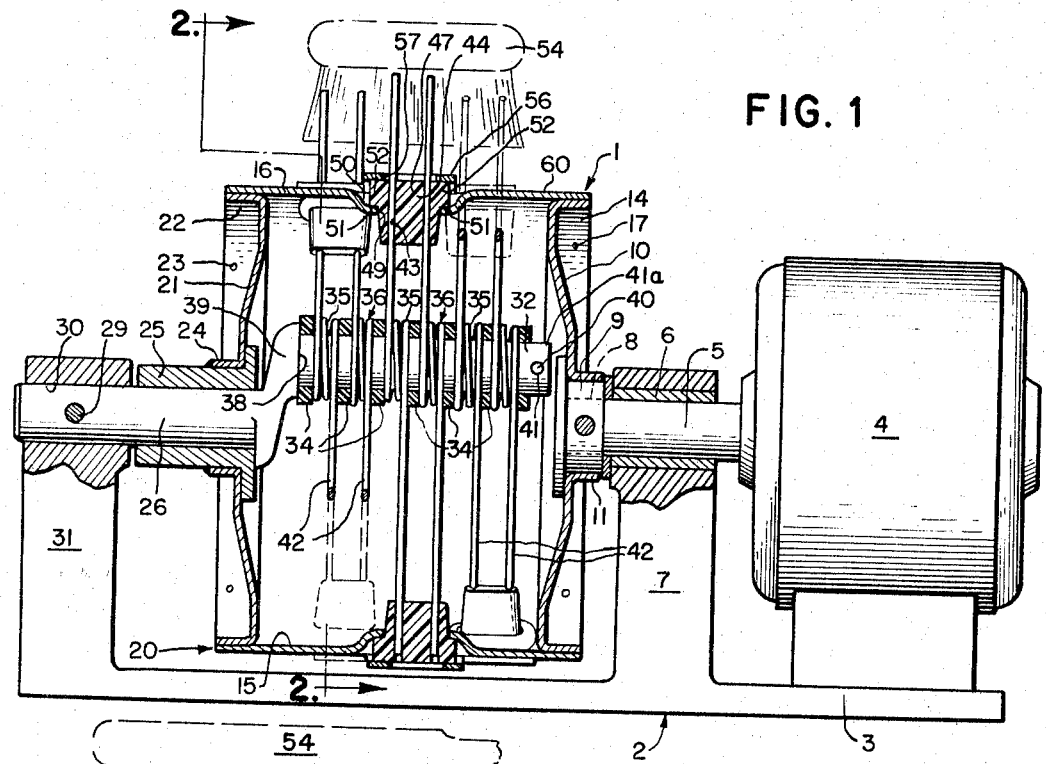
FIG. 1
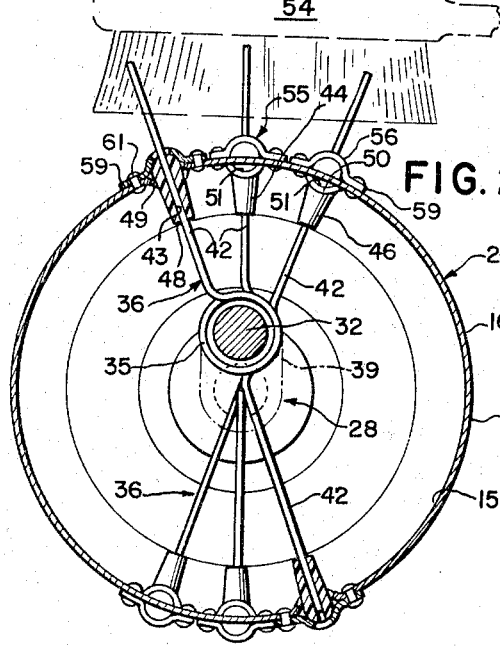
FIG. 2
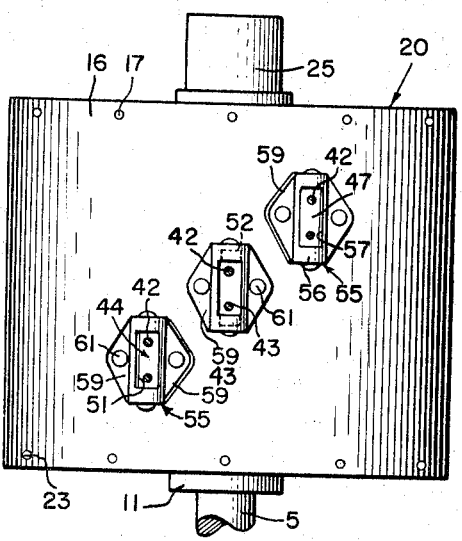
FIG. 3
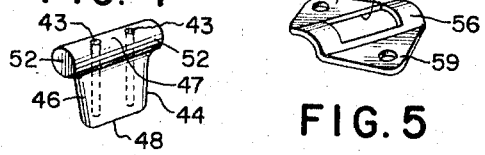
FIG. 4
FIG. 5
INVENTORS
William T. Gundelfinger
Edwin F. Huddle
By John J. Kowalik
Attorney United States Patent Office 3,321,789
Patented May 30, 1967

3,321,789
HAIR BRUSH CLEANING DEVICE
William T. Gundelfinger, Star Rte., Harbor Springs, Mich. 49740, and Edwin F. Huddle, 1700 N. 77th Court, Elmwood Park, Ill. 60635
Filed Oct. 21, 1965, Ser. No. 499,980
11 Claims. (Cl. 15—38)

This invention relates to a device for cleaning hair brushes, that is, for removing hair snagged in the bristles.

In the beauty trade one of the most tedious and time consuming tasks is the cleaning of brushes. For sanitary reasons also it is necessary that the brush be absolutely clean so as not to transmit infections from one customer to another.

A general object of the invention is to devise a novel brush cleaning device which is of simple and durable construction and which is effective and easy to use.

A further object of the invention is to provide a novel brush cleaner in which there are provided a plurality of raking or combing tines within a drum, said tines being arranged to project out of the drum in an area where they are intended to rake through the brush bristles, said tines being arranged to withdraw into the drum and to thereby strip any hair adhering or wrapped thereabout.

More specifically the invention contemplates a brush cleaning device comprising a cylindrical drum rotatable about its axis and a plurality of cleaning fingers or tines mounted for rotation about an axis eccentric with respect to the rotational axis of the drum, the tines extending radially through bearings mounted on the drum whereby the tines are permitted to swing circumferentially of the drum to position at a positive inclination to the brush bristles as the tines pass through the brush and to thus obtain a good purchase on the hair strands in the brush so as to effectively pull them off the bristles.

Another object of the invention is to provide a novel arrangement and construction of the tine structure wherein each tine structure has an intermediate coil portion adapted to sleeve upon the crank or eccentric whereby providing a mounting for the tine structure, each coil being expandable axially of the crank portion whereby the tine assemblies thereon collectively hold themselves at close fitting tolerances on the crank, each coil portion having oppositely extending tine elements at opposite ends which project generally radially through bearings mounted on the drum cylinder and the coil being stressed circumferentially whereby the tines are biased against the sides of the bores so as to prevent their rattling and rapid destruction.

These and other objects and advantages inherent in and encompassed by the invention will become more readily apparent from the specifications and the drawings, wherein:

FIGURE 1 is a side elevational view of our novel brush cleaner, the drum being shown in axial cross-section;

FIGURE 2 is a cross-sectional view taken substantially on line 2—2 of FIG. 1;

FIGURE 3 is a side view of the drum portion;

FIGURE 4 is a perspective view of the tine bearing; and

FIGURE 5 is a perspective view of the tine bearing clamp.

*Description of the invention*

Describing the invention in detail, there is shown a brush cleaning device generally designated 1 comprising a support indicated 2 including a base 3 at one end of which there is suitably mounted an electric motor 4 which has an output shaft 5.

The shaft 5 extends through a bearing 6 in the upper end of a pedestal 7 which is upstanding from the base 2. The shaft 5 extends through the bore 8 of a hub 9 of an end cap 10 which may be press fitted or otherwise secured at its inner mounting sleeve portion 11 to and about the hub 9. The hub 9 is secured as by a pin 12 or otherwise to shaft 5 which rotates about preferably a substantially horizontal axis although the device will operate in any position.

The cap 10 has an outturned annular peripheral flange 14 which snugly fits into the interior periphery 15 of the cylinder 16 of the cleaning drum generally designated 20.

The cap or end member 10 is secured in any convenient way to the cylinder 16, preferably as by self-tapping metal screws 17. The cylinder and cap 10 as well as the opposite end cap 21 are preferably made of metal and may be spun aluminum although suitable plastic could be used. Cap 21 is the same as cap 10 and has an outturned flange 22 secured as by screws 23 to cylinder 16 and the inner mounting sleeve 24 is suitably secured as by press fitting welding otherwise to a hub bearing sleeve 25 which is journaled upon the mounting shaft portion 26 of a crank or eccentric designated as a whole as 28.

The shaft portion 26 is coaxial with the motor shaft 5 and is stationarily mounted as by pin 29 in a bore 30 in the upper end of a pedestal 31 which extends from and is connected to the base 3.

The crank 28 has a throw or eccentric shaft portion 32 which extends generally parallel with the shafts 26 and 5. A plurality of plastic self-lubricating washers 34, 34 such as nylon or the like are sleeved onto the crank 32 and between each pair of washers 34 there is interposed a coil portion 35 of a tine assembly 36 which are preferably of spring metal such as steel.

The coil portions are sleeved onto the crank part 32 and these are slightly compressed and so held between a shoulder 38 on the supported end 39 of the crank and a pin 40 extending through opening 41 in the free end 41a of the crank. Each coil is formed at opposite ends with oppositely extending tine elements 42, 42.

Each tine element extends through a bore 43 in a bearing element 44 mounted on the cylinder 16. Each bore 43 is disposed substantially radially of the drum and each bearing is generally T-shaped in side elevation as best seen in FIG. 4.

Each bearing has two such bores 43 which are disposed generally parallel and spaced laterally in the elongated portion 46 of the bearing 44, said portion 46 in the assembled position with the drum extending radially inwardly thereof. The outer end portion 47 of the bearing, which is of plastic such as nylon or the like, is elongated axially of the drum and forms the head of the T whereas portion 46 forms the leg. The portion 46 tapers or narrows toward its inner end 48 to facilitate its insertion through a slot 49 in the cylinder 16, the cylinder having an inwardly upset or offset portion 50 about the slot 49 which is elongated axially of the drum and is formed with bearing concaves 51, 51 at opposite ends of slot 49.

The outer end portion 47 has its ends 52, 52 cylindrical and these mount in respective concaves 51, 51. It will be realized that the bearings as well as the slots 49 are spiralled about the cylinder as best seen in FIG. 3 and thus the entire circumferential as well as axial extent of the cylinder is covered with tines and the spiral arrangement obtains a continuous uniform engagement of the tines with the brush 54 as best seen in FIGURES 1 and 2.

The bearings are held in the respective concaves by keepers or clamps 55, each of which has a convex intermediate portion 56 complementally engaging the outer side of the end portion 47 of the respective bearing. Portion 56 is apertured with an elongated slot 57 through which two tines project. Each keeper has a securing lug portion 59 at each side of the intermediate portion 56 and each portion 59 is secured to the external side 60 of the drum in its respective position as by rivet 61, 61. Thus the tines and the bearings are pivotal about axes extending axially of the drum. Adjacent tine assemblies have their opposite tines paired in the same bearing block. It will be noted that these tines are under torsional load since the respective springs are appropriately wound. Thus the tines are held under light pressure against the bearings 44 biasing the latter circumferentially of the cylinder whereby the bearings are held in close contact with the bearing supports 51, 56 so that they do not vibrate when rotated and at the same time the tines in being held closely to the sides of the bores 43. This insures that the tines, which are extended on the upper side of the drum as seen in FIGURE 4 and gather the hair from the brush, will strip the hair off when they retract into the drum on its underside. Thus the construction and arrangement of the tines not only obtains an effective combing action but the tine structures hold all the parts under load so that there is no backlash.

Having described the preferred embodiment of the invention in detail, other forms will now become readily apparent within the scope of the appended claims.

We claim:

1. In a hair brush cleaner, a rotatable drum comprising a plurality of perforations therein, ecentric means in the drum, brush stripping tine assemblies rotatably mounted on said means and comprising tines projecting through said perforations, said tines extending on one side of the drum for raking engagement with a brush and retracting on the other side of the drum for stripping hair picked up by the tines, and said tine assemblies comprising a spring coil sleeved over said eccentric means and said tines extending in opposite directions from opposite ends of the coil.

2. The invention according to claim 1 and said means comprising a crank throw and spacers between the coils of said tine assemblies, and abutment means outwardly of said throw and holding said spacers and coils under compression therebetween.

3. In a hair brush cleaner, a rotatable drum comprising a plurality of perforations therein, eccentric means in the drum, brush stripping tine assemblies rotatably mounted on said means and comprising tines projecting through said perforations, said tines extending on one side of the drum for raking engagement with a brush and retracting on the other side of the drum for stripping hair picked up by the tines, and bearings means pivotally mounted on said drum and sleeved over each tine, each tine assembly including a spring coil and said tines of each assembly biased by the related coil into engaged position with the respective bearing means.

4. In a brush cleaner having a pivot element therein, a tine assembly comprising a coil portion and a pair of brush-engaging tines extending from opposite ends of the coil portion transversely thereof, said coil portion serving as a sole mounting and pivot means for the assembly and being sleeved over said pivot element.

5. A bearing block for a tooth mounting in a brush cleaner comprising a plastic element formed of nylon material and the like, said block being generally T-shaped in side elevation and having an outer portion with a pair of cylindrical end trunions for mounting in associated bearing concaves, said block having an elongated portion with aperture means therein for mounting tine means for reciprocation therein.

6. The combination of a rotatable cylinder, bearing means mounted thereon for pivotal movement about axes generally parallel with the axis of rotation of the cylinder, means rotatably mounting said cylinder, crank means in the cylinder, tine means having outer end portions mounted in each bearing means for reciprocation therein and having inner end portions journaled on the crank means, said inner end portions comprising coil springs extending generally normal to said tine means and sleeved on said crank means and biasing said tine means against the respective bearing means and operative to wind and unwind to accommodate different angular dispositions of the respective tines as said tine means rotate about said crank means and reciprocate with respect to said cylinder.

7. The combination of a rotatable cylinder, bearing means mounted thereon for pivotal movement about axes generally parallel with the axis of rotation of the cylinder, means rotatably mounting said cylinder, crank means in the cylinder, tine means having outer end portions mounted in each bearing means for reciprocation therein and having inner end portions journaled on the crank means, said inner end portions comprising coil springs extending generally normal to said tine means, and means intercollated with said coil springs and holding the same under compression to restrict shifting of the assemblies longitudinally of the crank means and holding the outer end portions in radial alignment with respective bearing means.

8. The combination of a rotatable cylinder, bearing means mounted thereon for pivotal movement about axes generally parallel with the axis of rotation of the cylinder, means rotatably mounting said cylinder, crank means in the cylinder, tine means having outer end portions mounted in each bearing means for reciprocation therein and having inner end portions journaled on the crank means, said inner end portions comprising coil springs extending generally normal to said tine means, means intercollated with said coil springs and holding the same under compression and said coil springs stressed torsionally and holding the tine means tightly to the respective bearing means.

9. The invention according to claim 6 and said means rotatably mounting said drum comprising a portion of said crank means journaling one end of said drum and a motor having a shaft coaxial with said portion and connected to the other end of the drum in driving relation thereto.

10. In a brush cleaner, a base having a pair of upstanding pedestals, a crank fixedly mounted on one pedestal and providing a shaft portion, a motor having a shaft portion journaled on the other pedestal coaxially with the first-mentioned shaft portion, and drum connected at one end to the motor shaft and journaled on the other end to said shaft portion of the crank and a plurality of teeth having coil portions stressed torsionally and rotatably mounted on the crank, said teeth reciprocating through the drum pursuant to rotation of the drum.

11. A brush cleaner comprising a drum having perforations, a crank in the drum, and teeth mounted on the crank and projecting through the perforations, and coils connected to said teeth and stressed to hold said teeth in predetermined angular positions in different locations about the crank to afford a positive raking action of the teeth on a brush to be cleaned.

(References on following page)

References Cited

UNITED STATES PATENTS

| | | | |
|---|---|---|---|
| 2,431,397 | 11/1947 | Harrison | 56—364 X |
| 2,644,292 | 7/1953 | Oberholtz et al. | 56—364 |
| 2,803,505 | 8/1957 | Oberholtz | 56—364 X |
| 2,811,008 | 10/1957 | Plant | 56—400 X |
| 2,860,350 | 11/1958 | Miller. | |
| 3,072,448 | 1/1963 | Melton et al. | |
| 3,072,939 | 1/1963 | Rehberg | 15—38 |
| 3,147,501 | 9/1964 | Schulz et al. | 15—38 |
| 3,150,393 | 9/1964 | Taylor et al. | 15—23 |

FOREIGN PATENTS 93,325  4/1962  Denmark.

CHARLES A. WILLMUTH, *Primary Examiner.*

E. L. ROBERTS, *Assistant Examiner.*